(12) United States Patent  (10) Patent No.: US 8,158,691 B2
Motz et al.  (45) Date of Patent: Apr. 17, 2012

(54) AQUEOUS REINFORCED RUBBER DISPERSIONS AND THEIR USE FOR MAKING LATEX FOAMS

(75) Inventors: Heike Motz, Marl (DE); Sabine Hahn, Haltern (DE); Hans-Peter Schwenzfeier, Dorsten (DE); Christoph Scholten, Gelsenkirchen (DE)

(73) Assignee: Polymer Latex GmbH & Co. KG, Marl (DE)

( * ) Notice: Subject to any disclaimer, the term of this patent is extended or adjusted under 35 U.S.C. 154(b) by 835 days.

(21) Appl. No.: 11/396,246

(22) Filed: Mar. 31, 2006

(65) Prior Publication Data

US 2006/0241198 A1 Oct. 26, 2006

Related U.S. Application Data

(60) Provisional application No. 60/668,298, filed on Apr. 4, 2005.

(51) Int. Cl.
*C08J 9/28* (2006.01)
*C08J 9/30* (2006.01)
*C08L 25/02* (2006.01)

(52) U.S. Cl. ............... 521/70; 521/65; 521/71; 525/241

(58) Field of Classification Search .................... 521/65, 521/70, 71; 525/241
See application file for complete search history.

(56) References Cited

U.S. PATENT DOCUMENTS

| | | | |
|---|---|---|---|
| 2,432,353 A * | 12/1947 | Talalay ............................ | 264/28 |
| 3,330,795 A | 7/1967 | Schluter | |
| 3,673,133 A * | 6/1972 | Schmidt ......................... | 521/66 |
| 3,966,661 A | 6/1976 | Feast et al. | |
| 4,477,612 A | 10/1984 | Boutsicaris | |
| 4,537,915 A | 8/1985 | Oberle et al. | |
| 5,332,621 A * | 7/1994 | Schmidt et al. .............. | 428/318.4 |
| 5,500,469 A | 3/1996 | Johnsen et al. | |
| 5,721,035 A * | 2/1998 | Dunn .............................. | 428/95 |
| 5,750,618 A | 5/1998 | Vogt et al. | |
| 5,872,189 A | 2/1999 | Bett et al. | |
| 6,391,952 B1 | 5/2002 | Bett et al. | |
| 6,579,940 B1 | 6/2003 | Dove | |
| 6,627,670 B2 * | 9/2003 | Mork et al. ...................... | 521/65 |
| 6,818,236 B2 | 11/2004 | Hill et al. | |
| 6,844,385 B1 | 1/2005 | Hagiwara et al. | |
| 6,870,019 B2 | 3/2005 | Kajiwara et al. | |
| 2002/0120025 A1 | 8/2002 | Balk et al. | |
| 2004/0030027 A1 | 2/2004 | Konno et al. | |
| 2005/0038174 A1 | 2/2005 | Suzuki | |
| 2005/0182159 A1 | 8/2005 | Udagawa et al. | |

FOREIGN PATENT DOCUMENTS

| | | |
|---|---|---|
| CN | 1426317 A | 6/2003 |
| CN | 1483058 A | 3/2004 |
| DE | 1 056 364 | 4/1959 |
| DE | 1 213 984 | 12/1963 |
| DE | 2 150 872 | 4/1973 |
| EP | 0 062 989 A2 | 10/1982 |
| EP | 0 187 905 A2 | 10/1985 |
| EP | 0 559 150 A1 | 9/1993 |
| EP | 0 753 530 A2 | 1/1997 |
| EP | 1053258 A1 | 11/2000 |
| EP | 1063258 A2 | 12/2000 |
| EP | 1209192 A1 | 5/2002 |
| EP | 1215236 A2 | 6/2002 |
| EP | 1361247 A1 | 11/2003 |
| GB | 804 208 | 11/1958 |
| GB | 1 303 045 | 1/1973 |
| GB | 1406051 A | 9/1975 |
| GB | 1546387 A | 5/1979 |
| GB | 1 253 267 | 11/1997 |
| JP | S63-243147 | 10/1988 |
| JP | H11-092595 | 4/1999 |
| JP | H11-293590 | 10/1999 |
| JP | 2001-011126 A | 1/2001 |
| JP | 2002-226508 A | 8/2002 |
| JP | 2002-241412 A | 8/2002 |
| JP | 2003-531249 T2 | 10/2003 |
| JP | 2004-027135 A | 1/2004 |
| JP | 2004 196921 | 7/2004 |
| JP | 2004-300302 A | 10/2004 |
| KR | 2002-0093072 | 12/2002 |
| SU | 971852 A1 | 11/1982 |
| WO | WO 99/40122 A1 | 8/1999 |

(Continued)

OTHER PUBLICATIONS

Hawley's Condensed Chemical Dictionary, 2002, John Wiley & Sons. Inc., 14th Edition.*

(Continued)

*Primary Examiner* — Liam Heincer
(74) *Attorney, Agent, or Firm* — Knobbe Martens Olson & Bear LLP

(57) ABSTRACT

The present invention relates to an aqueous reinforced rubber dispersion comprising:
a) 51 to 90 wt-% of base latex polymer particles; and
b) 10 to 49 wt-% of reinforcing latex polymer particles comprising structural units of aromatic vinyl monomers and conjugated diene monomers, the reinforcing latex polymer particles having a single glass transition temperature (Tg) from −25° C. to 28° C. as measured by differential scanning calorimetry (DSC), whereby
the weight percentages are based on the total weight of polymer particles in the rubber dispersion and the base latex polymer particles have a Tg as measured by DSC that is lower than the Tg of the reinforcing latex particles, to the use of the rubber dispersion for making latex foam, to a method for making latex foam and to an article comprising the latex foam obtained from the rubber dispersion of the present invention.

35 Claims, No Drawings

FOREIGN PATENT DOCUMENTS

| | | |
|---|---|---|
| WO | WO 00/11980 A1 | 3/2000 |
| WO | WO 01/30876 A2 | 5/2001 |
| WO | WO 01/80916 A2 | 11/2001 |
| WO | WO 02/18490 A2 | 3/2002 |
| WO | WO 02/38640 A2 | 5/2002 |
| WO | WO 02/50177 A2 | 6/2002 |
| WO | WO 03/006513 A1 | 1/2003 |
| WO | WO 03/062307 A2 | 7/2003 |
| WO | WO 03/066729 A2 | 8/2003 |

OTHER PUBLICATIONS

D.C. Blackley, in High Polymer Latices vol. 1, 1996; pp. 73-86.

D.C. Blackley in *Polymer Latices—Science and Technology*, Second Edition, Chapman & Hall, New York (1997).

Encyclopedia of Polymer Science and Engineering vol. 14:719-746 1985, John Wiley & Sons, pp. 719-746.

Blackley, D.C, High Polymer Latices, vol. 1, 1966, pp. 69-89.

Maarse, et al., "Handbuch der Aroma Forschung," Akademie Verlag, Berlin, 1981.

Schnetger, J., "Lexikon der Kautcshuktechnik, 2. Auglage," 2.edition, 1991 Huthig Buch Verlag, Heidelberg.

Sakota, K. and Okaya, T. 1977 "Electrolyte stability of carboxylated latexes prepared by several polymerization processes" *J Applied Polymer Science* 21:1025-1034.

*No-Fume LD* v. *Frank Pitchford & Co. Ltd.* (May 29, 1935) in Reports of Patent, Design and Trademark Cases, vol. LII, No. 7: pp. 231-253.

\* cited by examiner

US 8,158,691 B2

AQUEOUS REINFORCED RUBBER DISPERSIONS AND THEIR USE FOR MAKING LATEX FOAMS

CROSS-REFERENCE TO RELATED APPLICATIONS

This application claims the benefit of U.S. Provisional Patent Application No. 60/668,298, filed Apr. 4, 2005, the entire disclosure of which is hereby expressly incorporated by reference herein.

FIELD OF THE INVENTION

The present invention relates to new aqueous reinforced rubber dispersions, their use for making latex foam, to a method for making a latex foam and to an article comprising a latex foam obtained from the inventive rubber dispersion.

DESCRIPTION OF THE RELATED ART

Latex foam is prepared according to the prior art from aqueous highly concentrated rubber dispersions with the addition of sulfur crosslinking vulcanizing agents as, for example, described in DE-OS-2150872. It is often advantageous that rubber dispersions contain dispersions of a reinforcing material whereby the type and amount of this reinforcing component greatly influences the properties of the finished latex foam. In general latex foam is required to have high elasticity, in particular in the temperature range wherein the specific latex foam article will be used. Furthermore, this elasticity must not be lost, even during prolonged compression and especially in continuous use. This is of particular interest for latex foam articles, like mattresses and pillows. Accordingly the compression set in the temperature range of ordinary use should be as small as possible. Furthermore, in the past it has been considered as advantageous that the recovery of the compressed latex foam article should be as rapid as possible, i.e. the hysteresis should be as small as possible. Further requirements of a latex foam is a high tensile strength and a high elongation at break. Furthermore, at a predetermined hardness of the foam its density should be as low as possible in order to be able to produce the foam articles as economically as possible with regard to the amount of rubber dispersion which has to be used.

GB-A-1 253 267 discloses a rubber dispersion comprising a base polymer latex of a 30/70 copolymer of styrene/butadiene and a reinforcing latex of a 70/30 copolymer of styrene/butadiene. From the experimental data it is evident that a styrene/butadiene ratio of 70/30 gives optimum results with respect to compression set and rebound properties. Reinforcing latices having a lower or higher styrene content were considered as inappropriate with respect to the balance of these properties.

Dispersions of single-phase reinforcing latices, as those described in GB-A-1 253 267 have already been considered in DE-OS-1056364 as being disadvantageous since they do not meet the requirements for low values for the compression set over a wide temperature range. According to the teaching of that reference better results are obtained by the use of multiphase graft copolymer dispersions which have a comparable overall composition and are prepared in a two-stage batch process. A further improvement of multiphase graft copolymer dispersions is described in EP-A-187905. The latex foams prepared from those rubber dispersions show particularly low values for the compression set in the total temperature range from 20-70°.

EP-A-753530 considers the multiphase graft copolymer dispersions known from EP-A-187905 as disadvantageous since they have a poor resilience of the latex foams prepared from these dispersions which is evident from relatively high hysteresis values.

In order to overcome this deficiency a reinforcing multiphase polymer having a distinguished core shell structure whereby the particles consist of 20-75 weight percent of a hard inner phase having a glass transition temperature above 70° C. comprising 90-100 weight percent of aromatic monovinyl compounds and 10-0 weight percent of aliphatic conjugated dienes and 78-15 weight percent of a soft outer phase having a glass transition temperature below 20° C. comprising 30-70 weight percent of aromatic monovinyl compounds and 70-30 weight percent of aliphatic conjugated dienes, and 2-10 weight percent of a transition region between these phases whose copolymer compositions are between those of the hard and of the soft phases is taught.

From the experimental data in EP-A-753530 it is evident that latex foams prepared by using the multiphase reinforcing latex as described therein have a considerably lower hysteresis than the foams prepared by using the reinforcing latex described in EP-A-187905.

In the recent past it has been discovered that high resilience of a latex foam, or in other words, low hysteresis values, are not desirable for all applications of latex foams. This is especially true for latex mattresses and pillows. High resilience means that after compression of, for example, a mattress it quickly returns after removal of the load into the original shape. Thus a high elastic force acts against the load compressing the mattress. Consequently a person lying on a mattress having high resilience or in other words a low hysteresis will experience a steady elastic force against the body that may lead to a compression of body tissue resulting in an impaired blood circulation. This will considerably reduce the sleeping comfort or may be even dangerous, especially for patients who are confined to bed.

In case of a pillow made of a highly resilient polymer latex foam a resting or sleeping person will experience a steady force against the head and neck, resulting in discomfort and possible muscle distortions which are one of the main reasons for back ache.

Thus it is an object of the present invention to provide an aqueous rubber dispersion that results in latex foams having at a predetermined desired hardness a visco-elastic behavior, i.e. the elastic force and the recovery rate of the compressed foam is adjusted to avoid the above described disadvantages of highly resilient latex foams.

It is a further object of the present invention to provide an aqueous polymer dispersion that results in a latex foam having at a predetermined desired hardness an acceptable relatively high hysteresis, as will be discussed below.

Furthermore it would be advantageous to have a rubber dispersion resulting in a latex foam whereby the hysteresis can be easily adjusted while holding the hardness of the latex foam approximately constant.

SUMMARY OF THE INVENTION

These objects have been surprisingly attained by an aqueous reinforced rubber dispersion comprising:

a) 51 to 90 wt-% of base latex polymer particles; and b) 10 to 49 wt-% of reinforcing latex polymer particles comprising structural units of aromatic vinyl monomers and conjugated diene monomers, the reinforcing latex polymer particles having a single glass transition temperature (Tg) from −25° C. to 28° C. as measured by differential scanning calorimetry (DSC), whereby the weight percentages are based on the total weight of polymer particles in the rubber dispersion and the base latex polymer particles have a Tg as measured by DSC that is lower than the Tg of the reinforcing latex particles.

Furthermore the present invention relates to the use of the above defined rubber dispersion for making latex foam.

According to a further aspect the present invention relates to a method for making a latex foam by a) compounding the rubber dispersion of the present invention into a foamable and vulcanizable latex compound;
b) foaming the vulcanizable latex compound;
c) filling the foam obtained in step b) into a mould of desired shape;
d) stabilizing the foam structure;
e) vulcanizing the foam; and
f) removing the vulcanized latex foam from the mould.

The present invention according to a further aspect relates to an article comprising a latex foam obtained from a rubber dispersion according to the present invention.

DETAILED DESCRIPTION OF THE PREFERRED EMBODIMENT

Contrary to the teaching of the prior art, as exemplified by EP-A-187905 and EP-A-753530 the reinforcing latex polymer particles to be used in the rubber dispersion according to the present invention do not contain two distinguishable polymer phases. Thus the reinforcing polymer latex particles according to the present invention form a single polymeric phase that does not have to be necessarily absolutely homogeneous with respect to the monomer distribution within the polymer particles. Thus a certain fluctuation in monomer distribution, for example, a gradient of monomer distribution along the radius of the polymer particles is encompassed in the present invention as long as no two distinct polymer phases are detectable.

It is believed that these structural properties of the reinforcing latex polymer particles of the present invention are best described in that the inventive particles have a single glass transition temperature.

According to the present invention the reinforcing latex polymer particles have a single glass transition temperature (Tg) from −25° C. to 28° C., as measured by differential scanning calorimetry (DSC). Preferred upper limits of the $T_g$ range according to the present invention are selected from 27° C., 26° C., 25° C., 24° C., 23° C., 22° C., 21° C., 20° C., 19° C. or 18° C. as measured by DSC. Preferred ranges are from −20° C. to 25° C., more preferred from −15° C. to 22° C., and most preferred from −15° C. to 20° C.

Furthermore, the aqueous reinforced rubber dispersion according to the present invention requires that the Tg as measured by DSC of the base latex polymer particles is lower than the Tg of the reinforcing latex particles. Preferable the difference between the Tg of the base latex polymer particles and the reinforcing latex particles is at least 25° C., preferably at least 30° C. and most preferably at least 35° C. $\Delta T_G$ should be at most 79° C., preferably at most 75° C. and most preferably at most 72° C.

The single glass transition temperature of the reinforcing latex polymer particles of the present invention can advantageously be adjusted by preparing a reinforcing latex polymer comprising 45-68.5 weight percent structural units of aromatic vinyl monomers and 31.5-55 weight percent structural units of conjugated diene monomers. It is preferred that the reinforcing latex polymer particles comprise 45-67 weight percent, more preferred 48-65 weight percent structural units of aromatic vinyl monomers and 33-55 weight percent, most preferred 35-42 weight percent structural units of conjugated diene monomers.

The aromatic vinyl monomers for preparation of the reinforcing latex polymer particles are selected from styrene, α-methyl styrene, 4-methyl-styrene, α-chlor styrene, 4-chloro styrene, divinylbenzene, 4-methoxy-3-methylstyrene, 3,4-dimethyl-α-methylstyrene and combinations thereof. Preferably the aromatic vinyl monomer is styrene.

The conjugated diene for the reinforcing latex polymer particles is preferably selected from 1,3-butadiene, 2-chloro-1,3-butadiene, isoprene, conjugated straight-chain and branched pentadienes and hexadienes, and combinations thereof. In view of availability and cost considerations 1,3-butadiene is most preferred.

The reinforcing latex polymer according to the present invention can be prepared by standard emulsion polymerization methods in an aqueous phase as the dispersion medium, as known by the person skilled in the art.

For the polymerization the required amount of monomers is preferably added in a feed process and emulsified in the aqueous phase by continuous vigorous stirring. Appropriate amounts of initiator and emulsifier are also added in a feed process in order to initiate the emulsion polymerization. Monomer and emulsifier can be added in the same manner also as an aqueous emulsion. Alternatively a part of the corresponding monomers can be initially introduced with a matched amount of initiator and emulsifier and can be polymerized in a batch reaction. The remaining amounts of monomers, emulsifier and initiator are then metered in thereafter into the feed. The amounts of initiator, emulsifier and monomer should be matched with one another in such a way that the weight average particle diameter of the reinforcing latex particle of the present invention as measured by the methods described below with respect to the particle size distribution of the reinforcing latex is 50 to 250 nm and preferably 130 to 160 nm.

The reaction for the preparation of the reinforcing polymer latex of the present invention is carried out by suitable choice of the reaction temperature, reaction time and feed time in such a way that the monomer conversion at the end of this reaction is at least 95%, preferably more than 98%, and most preferred the conversion should be at least 99%.

The reinforcing polymer latex is preferably stabilized using the customary fatty acid soaps and/or rosin soaps which lead to dispersions having increased pH values of between 8 and 12 depending on the alkalinity of these emulsifiers. The polymerization takes place at these pH values. The content of emulsifier is preferably between 0.5 and 10 weight percent, based on the total amount of monomers, more preferred between 2 and 6 weight percent.

Advantageously 0.05-2 weight percent, based on the total amount of monomers of free radical initiators are used for the polymerization. All soluble and all water-soluble azo initiators, peroxides, hydroperoxides and peroxodisulfates are suitable for this purpose. In the polymerization at relatively high temperatures peroxodisulfates are preferably used. If on the other hand polymerization is effected at low temperatures peroxides and hydroperoxides in combination with a reducing agent are preferably used. Suitable reducing agents are, for example, sodium bisulfate, ascorbic acid and sodium formaldehyde sulfoxilate, preferably also in combination with an iron-II salt. Polymerization temperature is typically between zero and 90° C. depending on the initiator system, preferably between 60 and 85° C. when a peroxodisulfate is used as the initiator and preferably between 10 and 17° C. when a redox initiator system is used.

Furthermore, chain transfer agents can be used for regulating the molecular weight and the degree of crosslinking. Particularly preferred are aliphatic straight-chain or branched mercaptanes in an amount of 0.1-2 weight percent, based on the total amount of the monomers.

It is important for the present invention that the emulsion polymerization process for making the reinforcing latex polymer is carried out in such a way that the final latex particles resulting from the process constitute a single polymer phase having a single glass transition temperature. Although, as explained above, a certain fluctuation of monomer distribution throughout the polymer particle is acceptable any conditions should be avoided that result in polymer particles having distinct polymer phases, like for example, core shell structures or any other structures resulting in at least two distinguishable glass transition temperatures as measured by DSC methods.

The solids content of the reinforcing polymer latex of the present invention is preferably between 30 and 70 weight percent, more preferred between 40 and 60 weight percent.

The aqueous reinforced rubber dispersions according to the present invention are prepared by mixing the base polymer latex and the reinforcing polymer latex of the present invention in relative amounts to result in 51-90 weight percent of base latex polymer particles and 10-49 weight percent of reinforcing latex polymer particles whereby the weight percentages are based on the total weight of polymer particles in the rubber dispersion. Preferably the rubber dispersion of the present invention comprises 55-85 weight percent, more preferred 58-80 weight percent of the latex polymer particles and 15-45 weight percent, more preferred 20-42 weight percent of reinforcing latex polymer particles.

After mixing the solid content of the aqueous rubber dispersion of the present invention is adjusted to be preferably at least 55 weight percent, more preferred at least 60 weight percent, most preferred at least 65 weight percent, based on the total weight of the dispersion, by evaporation of excess water.

The base latex polymer according to the present invention is preferably selected from natural latex, synthetic styrene/butadiene rubber latex and combinations thereof. In case a styrene/butadiene rubber latex is used as the base latex, as mentioned above, the glass transition temperature should be lower than the glass transition temperature of the reinforcing polymer latex as measured by DSC methods.

According to a preferred embodiment of the present invention the base latex polymer is a styrene/butadiene rubber latex comprising 15-32 weight percent structural units of styrene and 68-85 weight percent structural units of 1,3-butadiene, preferably 20-30 weight percent, more preferred 22-30 weight percent structural units of styrene and 70-80 weight percent, more preferred 70-78 weight percent structural units of 1,3-butadiene, whereby the weight percentages are based on the total weight of styrene and 1,3-butadiene structural units.

The aqueous reinforced rubber dispersion according to the present invention is preferably used for making a latex foam.

Thus, the present invention relates also to a process for making a latex foam by
a) compounding the rubber dispersion of the present invention into a foamable and vulcanizable latex compound;
b) foaming the vulcanizable latex compound;
c) filling the foam obtained in step b) into a mould of desired shape;
d) stabilizing the foam structure;
e) vulcanizing the foam; and
f) removing the vulcanized latex foam from the mould.

In order to compound the rubber dispersion of the present invention into a foamable and vulcanizable latex compound the dispersion is preferably mixed with emulsifiers, thickening agents and a vulcanizing paste as known by a person skilled in the art.

Emulsifiers are added to the rubber dispersion of the present invention in order to increase its mechanical and chemical stability and to facilitate foaming of the rubber dispersion. Anionic, cationic or non-ionic surfactants can be chosen depending on the process requirements whereby anionic surfactants are preferred for foaming applications. Preferred anionic surfactants are fatty acid soaps, fatty alcohol sulfonates and alkylaryl or aralkyl sulfonates, succinates and amido sulfosuccinates. Particularly preferred are alkali metal and ammonium salts of fatty acids and rosin acids and combinations thereof, most preferred are alkali metal salts of fatty acids and rosin acids and combinations thereof.

The vulcanization paste, preferably employed in the foaming process of the present invention, comprises sulfur or sulfur compounds, zinc oxide, vulcanization accelerators and customary additives, like anti-aging agents or surfactants. Examples of suitable sulfur compounds are described in D. C. Blackley, High Polymer Latices, Vol. 1 1966, pages 69-72.

Suitable vulcanization accelerators are described in D. C. Blackley, High Polymer Latices, Vol. 1 1966, pages 73-86, and in Encyclopedia of Polymer Science and Engineering, Vol. 14, John Wiley & Sons, pages 719-746 (1985).

Suitable anti-aging agents are described in D. C. Blackley, High Polymer Latices, Vol. 1 1966, pages 86-89.

The vulcanization pastes are suitably applied in amounts of 3-15 weight percent, preferably 4-12 weight percent, and most preferred 4-10 weight percent, based on the weight of the solids of the rubber dispersion.

The thus obtained foamable and vulcanizable latex compound can be processed by any process known to the person skilled in the art for making foamed articles.

Preferably the foamable and vulcanizable latex compound is processed by the Dunlop process or the Talalay process, whereby the Dunlop process is most preferred.

In case the foamed article is prepared according to the Dunlop process an appropriate amount of gelling agent is added to the readily mixed vulcanizable latex compound. The quantity of the gelling agent will depend on the desired pot life of the foamable compound which should be advantageously adjusted to be 5-20 minutes. Preferably according to the Dunlop process an aqueous sodium silicofluoride dispersion is used as gelling agent. The compound can be first foamed and then the gelling agent is added and foaming is continued to obtain a homogeneous distribution of the gelling agent within the foam, the desired foam density, as well as the desired foam structure. Alternatively, after the addition of the gelling agent the compound is foamed immediately using mechanical means in a way to prepare a stable foam of the desired foam density. Thereafter the foamed latex compound is filled into the mould of desired shape. Usually closed moulds are used but in some cases, for example shoe soles, open moulds can be employed.

According to the Dunlop process the foam structure in the mould is stabilized by gelling the latex foam at elevated temperatures. Thereafter the moulds are heated, in case of close moulds preferably in saturated steam, to vulcanize the latex foam. After vulcanization the latex article is removed from the mould and if necessary washed and dried.

Alternatively the Talalay process may be employed to prepare the latex foams according to the present invention. In the Talalay process the vulcanizable latex compound is first pre-foamed to give a foam with relatively high density and then poured into the moulds. The closed moulds are then evacuated whereby the latex compound foams to the finally desired density due to the vacuum applied and thus fills the mould completely. By cooling the mould to approximately −30° C. the foam structure is stabilized. Thereafter carbon dioxide is lead into the mould to pressurize the mould whereby at the same time the pH of the frozen foamed latex compound is lowered resulting in gelling. The foam then may be thawed without changing its structure and the mould is heated in stages up to 110° C. to vulcanize the latex foam. After complete vulcanization the article is removed from the mould, optionally washed and dried.

The foamed articles of the present invention may be used for mattresses, pillows, neck rests, toppers, shock absorbers, shaped parts of shoes, shoe inside soles, garments padding, protectors for sportswear, athletic implements, bike saddles, motorbike saddles, furniture upholstery material, bumpers and automotive dashboards.

The latex foam of the present invention has preferably a hardness of less than 150 N, preferably less than 120 N, more preferred less than 100 N based on a dry foam density of 75 g/l measured at 23° C. according to DIN EN ISO 2439, 2001-02 and a hysteresis of at least 50%, preferably at least 55%, more preferred at least 60% as measured at a dry foam density of 75 g/l at 23° C. according to DIN 53577.

The following examples are provided for illustrative purposes only and these examples should not be interpreted in any way as limiting the present invention as it is defined in the appending claims.

EXAMPLES

Measuring Methods

The following measuring methods were used to determine the physical parameters of the rubber dispersion of the present invention, as well as of the latex foam. The Tg, the particle size distribution, the foam hardness and foam hysteresis is measured as follows. All data given within the entire specification including the claims are measured in accordance with the detailed description given below. Thus the description of the measuring methods is not restricted to the examples only.

1. Glass Transition Temperature

The glass transition temperature was measured according to DIN 53765. A traditional DSC system is used (Mettler Toledo Model DSC 30). The sample is dropped into a pan. Then the sample and the empty reference pan are placed into the DSC oven. The DSC oven is closed and the temperature program for the sample preparation is started. The program starts at 30° C. The heating rate is 20K/min. The maximum temperature is 160° C. which is held for 10 min. The sample is cooled down to −20° C. and again heated to 20° C. Afterwards the DSC measuring is started. The temperature program starts at −120° C. The heating rate is 20 k/min. The maximum temperature is 180° C. The raw data is collected and processed with the Mettler Toledo Star system providing the Tg data given. Finally the oven is cooled to room temperature again.

2. Particle Size Distribution

The particle size distribution is measured on the Particle Size Distribution Analyzer from PolymerLaboratories. The sample under investigation and a small molecule marker solution are introduced into the system via a two position, electrically actuated valve, such that the eluent flow is not interrupted. The sample components are separated by an HDC mechanism in a "cartridge", and their concentration is measured by a UV detector. The system is calibrated using a series of particle size standards.

3. Hardness

The hardness of the latex foam is measured in accordance with DIN EN ISO 2439:2001/02, following the method according to process A—determination of indentation hardness index.

This method was followed with the following exceptions.

The sample dimensions have been altered to have a square shape with an edge length of 280±2 mm and a sample thickness of 28±2 mm.

Conditioning of the samples was performed as follows.

After preparation the samples were conditioned at 23° C. for 16 h in the measuring chamber.

Standardization to a dry foam density of 75 g/dm³.

The hardness is normalized to a hardness at 75 g/dm³ according to the following equation:

$$A_{75} = \frac{148{,}239}{0{,}0099\sigma^2 + 2{,}1575\sigma - 69{,}261} \cdot A_x$$

whereby $A_x$ is the measured hardness as obtained according to the method described above and $\sigma$ is the actual density of the measured foam given in g/dm³.

4. Measuring of the Hysteresis

Hysteresis is measured in accordance with DIN 53577 1988-12 with the following alterations.

The dimension of the sample is as follows:

Square shape with an edge length of 60±2 mm and a thickness of 28±2 mm.

Hysteresis is measured on two samples instead of three, and the samples are conditioned for 16 h at 23° C. in the measuring chamber.

Reference Example 1

Reinforcing Latex Having a Ratio of Structural Units of Styrene to 1,3-Butadien of 80/20

The reactor is charged with a solution of 1.75 g potassium oleate, 2.8 g sodium hydroxide and 0.350 g ammonium persulfate in 1225.0 g deionized water. The reactor is purged with nitrogen three times. The mixture is heated to 75 C and the temperature is kept constant. Then a feeding of 0.42 g ammonium persulfate dissolved in 7.98 g deionized water is started. The amount of the solution added per unit time is 0.420 g/min. The starting point of this feed is the time 0 minutes. At time 5 minutes the feed of 2 further components is started simultaneously. The first component consists of 26.950 g butadiene. The feeding rate is 1.797 g/min. The second component consists of 0.385 g tertiary-dodecyl mercaptan in 107.8 g styrene. The feeding rate is 7.212 g/min. At time 20 minutes the feeding of ammonium persulfate, butadiene and styrene is stopped. The inner reactor temperature is heated to 81° C. within 15 minutes and then kept constant.

Then a feeding of 5.075 g ammonium persulfate dissolved in 96.425 g deionized water is started. The feeding rate is 0.312 g/min. The feeding is started at 35 minutes. At time 35 minutes the feeding of 4 other components is started simultaneously. The first component consists of 673.05 g butadiene. The feeding rate is 2.137 g/min. The second component consists of 10.115 g tertiary dodecyl mercaptan in 2692.2 g styrene. The feeding rate is 8.579 g/min. The third component consists of 109.025 g potassium oleate dissolved in 1086.12 g deionized water. The feeding rate is 3.102 g/min. The forth component consists of 1032.15 g deionized water. The feeding rate is 3.277 g/min. The feeds of butadiene, styrene, water and potassium oleate are stopped at time 350 minutes. The feed of ammonium persulfate is stopped at 360 minutes. The inner reactor temperature is heated from time 360 minutes within 20 minutes to 87° C. and kept constant. At time 360 minutes the feed of 2 components is started simultaneously. The first component consists of 10.43 g ammonium persulfate dissolved in 198.17 g deionised water. The feeding rate is 1.018 g/min. The second component consists of 35 g potassium oleate in 165 g deionized water. The feeding rate is 3.333 g/min. At time 420 minutes the feeding of potassium oleate is stopped. At time 565 minutes the feed of ammonium persulfate is stopped. At time 565 minutes a feeding of a solution of 35 g potassium oleate in 165 g deionized water is started. The feeding rate is 3.333 g/min. At time 625 minutes the feed of potassium oleate is stopped.

The mixture is cooled from time 625 minutes within 60 minutes to 25° C. and kept constant. At time 625 minutes the feed of 3.5 g sodium hydroxide dissolved in 31.5 g deionised water is started. The feeding rate is 2.333 g/min. At time 640 minutes the feed of sodium hydroxide is stopped. Finally, the latex has a solid content of 49.5%.

DSC measurement revealed a single $T_g$ at 47° C.

Reference Example 2

Reinforcing Latex Having a Ratio of Structural Units of Styrene to 1,3-Butadien of 70/30

The reactor is charged with a solution of 4.2 g potassium oleate, 10.5 g sodium hydroxide and 0.735 g ammonium persulfate in 1925.0 g deionized water. The reactor is purged with nitrogen three times. The mixture is heated to 75° C. and the temperature is kept constant. Then a feeding of 0.875 g ammonium persulfate dissolved in 16.625 g deionized water is started. The amount of the solution added per unit time is 0.875 g/min. The starting point of this feed is the time 0 minutes. At time 5 minutes the feed of 2 further components is started simultaneously. The first component consists of 40.390 g butadiene. The feeding rate is 2.693 g/min. The second component consists of 94.220 g styrene. The feeding rate is 6.281 g/min. At time 20 minutes the feeding of ammonium persulfate, butadiene and styrene is stopped. The inner reactor temperature is heated to 81° C. within 15 minutes and then kept constant.

Then a feeding of 35.0 g ammonium persulfate dissolved in 665.0 g deionized water is started. The feeding rate is 1.818 g/min. The feeding is started at 35 minutes. At time 35 minutes the feeding of 3 other components is started simultaneously. The first component consists of 1009.61 g butadiene. The feeding rate is 2,692 g/min. The second component consists of 2,355.78 g styrene. The feeding rate is 6.282 g/min. The third component consists of 106.085 g potassium oleate dissolved in 553.315 g deionized water. The feeding rate is 1.758 g/min. The feeds of butadiene, styrene and potassium oleate are stopped at time 410 minutes. The feed of ammonium persulfate is stopped at 420 minutes.

The inner reactor temperature is heated from time 420 minutes within 20 minutes to 87° C. and kept constant. At time 420 minutes the feed of 2 components is started simultaneously. The first component consists of 16.135 g ammonium persulfate dissolved in 306.565 g deionized water. The feeding rate is 1.574 g/min. The second component consists of 52.5 g potassium oleate in 247.5 g deionised water. The feeding rate is 3.333 g/min. At time 510 minutes the feeding of potassium oleate is stopped. At time 625 minutes the feed of ammonium persulfate is stopped.

The mixture is cooled from time 625 minutes within 60 minutes to 25° C. and kept constant. At time 625 minutes the feed of 13.405 g sodium hydroxide dissolved in 120.645 g deionised water is started. The feeding rate is 4.468 g/min. At time 655 minutes the feed of sodium hydroxide is stopped. Finally, the latex has a solid content of 49.4%.

DSC measurement revealed a single $T_g$ at 30° C.

Reference Example 3

Reinforcing Latex Having a Ratio of Structural Units of Styrene to 1,3-Butadien of 65/35

The reactor is charged with a solution of 4.2 g potassium oleate, 10.5 g sodium hydroxide and 0.735 g ammonium persulfate in 1925.0 g deionised water. The reactor is purged with nitrogen three times. The mixture is heated to 75° C. and the temperature is kept constant. Then a feeding of 0.875 g ammonium persulfate dissolved in 16.625 g deionised water is started. The amount of the solution added per unit time is 0.875 g/min. The starting point of this feed is the time 0 minutes. At time 5 minutes the feed of 2 further components is started simultaneously. The first component consists of 47.11 g butadiene. The feeding rate is 3.141 g/min. The second component consists of 87.5 g styrene. The feeding rate is 5.833 g/min. At time 20 minutes the feeding of ammonium persulfate, butadiene and styrene is stopped. The inner reactor temperature is heated to 81° C. within 15 minutes and then kept constant.

Then a feeding of 35.0 g ammonium persulfate dissolved in 665.0 g deionised water is started. The feeding rate is 1.818 g/min. The feeding is started at 35 minutes. At time 35 minutes the feeding of 3 other components is started simultaneously. The first component consists of 1177.89 g butadiene. The feeding rate is 3.141 g/min. The second component consists of 2187.5 g styrene. The feeding rate is 5.833 g/min. The third component consists of 106.085 g potassium oleate dissolved in 553.315 g deionised water. The feeding rate is 1.758 g/min. The feeds of butadiene, styrene and potassium oleate are stopped at time 410 minutes. The feed of ammonium persulfate is stopped at 420 minutes.

The inner reactor temperature is heated from time 420 minutes within 20 minutes to 87° C. and kept constant At time 420 minutes the feed of 2 components is started simultaneously. The first component consists of 16.135 g ammonium persulfate dissolved in 306.565 g deionised water. The feeding rate is 1.574 g/min. The second component consists of 52.5 g potassium oleate in 247.5 g deionised water. The feeding rate is 3.333 g/min. At time 510 minutes the feeding of potassium oleate is stopped. At time 625 minutes the feed of ammonium persulfate is stopped.

The mixture is cooled from time 625 minutes within 60 minutes to 25° C. and kept constant. At time 625 minutes the feed of 13.405 g sodium hydroxide dissolved in 120.645 g deionised water is started. The feeding rate is 4.468 g/min. At time 655 minutes the feed of sodium hydroxide is stopped. Finally, the latex has a solid content of 49.4%.

DSC measurement revealed a single $T_g$ at 20° C.

Examples 1-5 and Comparative Examples 1-10

The reinforcing latices according to Reference Example 1 (Comparative Examples 1-5), of Reference Example 2 (Comparative Examples 6-10) and of Reference Example 3 (Examples 1-5) were mixed with a base latex in the relative amounts specified in Table 1 below in order to prepare aqueous reinforced rubber dispersions.

As base latex a styrene/butadiene latex having the following characteristics was used (total solid content of about 67%, pH of about 10.5, $T_G$ of about −50° C.). The solid content of the thereby obtained aqueous reinforced rubber dispersions were adjusted to 63 weight percent based on the total weight of the dispersion by evaporation of excess water.

389.6 g of each aqueous reinforced rubber dispersion were weighted together with 10.8 g potassium oleate as 17.5% aqueous solution, 24.5 g of sodium carboxyl methyl cellulose solution 2.5% in water (Blanose NA-CMC Type 12M 31P available from Hercules GmbH) and 36.8 g of a 60% solid vulcanization paste Suprotex UGB, obtainable from Weserland Textilchemie, into the bowl of a Hobart Planetary Mixer (Type N50). In a separate vessel 23.1 g of 25% sodium silicofluoride dispersion in water was weighted. The aqueous reinforced rubber dispersion in the mixing bowl was foamed using the Hobart Planetary Mixer until a wet foam density of about 112 g/l was achieved that corresponds to a dry foam density of about 75 g/l.

Thereafter the sodium silicofluoride dispersion gelling agent was added and mixing was continued for 2 min to achieve homogeneous distribution of the gelling agent within the foam and a homogeneous foam structure.

The latex compound thus obtained from each composition according to the examples was filled into a 290 mm×290 mm×28 mm mould. The mould was sealed and its contents vulcanized at 100° C. with saturated steam for 20 min. The vulcanized foam was removed from the mould, washed and dried for 90 min at 120° C. in a forced circulation oven.

Thereafter the samples were conditioned and measured as indicated above with respect to the measuring methods. The actual foam density was measured for normalizing the hardness according to the above equation for a foam density of 75 g/dm³.

The results are given in Table 1 below.

TABLE 1

| Example | RL-Portion [%] | Corrected Hardness [N] 23° C. | Hysteresis [%] 23° C. |
|---|---|---|---|
| 1 | 40.5 | 103 | 84.9 |
| 2 | 32.9 | 91 | 76.3 |
| 3 | 30.4 | 95 | 65.3 |
| 4 | 25.4 | 94 | 58.5 |
| 5 | 20.4 | 98 | 54.7 |
| C1 | 40.5 | / | / |
| C2 | 32.9 | 1152 | / |
| C3 | 30.4 | 642 | 84.8 |
| C4 | 25.4 | 297 | 70.5 |
| C5 | 20.4 | 219 | 53.9 |
| C6 | 40.5 | 1489 | / |
| C7 | 32.9 | 390 | 85.6 |
| C8 | 30.4 | 345 | 81.3 |
| C9 | 25.4 | 199 | 69.2 |
| C10 | 20.5 | 166 | 55.0 |

RL = reinforcing latex
/ = not measurable

As can be seen from the experimental data in Table 1 the aqueous rubber dispersions according to the present invention lead to a latex foam having a desired hardness at a dry foam density of 75 g/dm³ of around 100N which is well below the upper limit of 150N for the desired hardness. At the same time the vulcanized foams exhibit a hysteresis of between 54.7 and 84.9% which is also above the target lower limit of at least 50%. Consequently the latex foam obtained fulfills the hardness requirements and shows the desired visco-elastic properties.

As can be seen from the Comparative Examples, although appropriate hysteresis values can be obtained the hardness of these foams is well above the target value of less than 150N. Thus appropriate visco-elastic behavior can only be achieved with the comparative dispersion at unacceptable high hardnesses.

At high levels of the comparative reinforcing latices hardness and/or hysteresis are even not measurable.

Moreover, it is evident from the experimental data that the hardness of the vulcanized latex foam of the present invention is virtually independent of the level of reinforcing latex whereas the hysteresis increases with increasing level of reinforcing latex, with the result that using the inventive polymer dispersion the visco-elastic properties can easily be adjusted at a given foam hardness by choosing an appropriate level of reinforcing latex.

In contrast thereto using the comparative polymer dispersion the hardness increases with increasing levels of reinforcing latex, with the result that if the desired visco-elastic properties are adjusted by using a specific level of reinforcing latex unacceptable hardness of the foam will likewise be obtained resulting in a non-usable product.

What is claimed is:

1. A method for making a latex foam comprising
   a) compounding into a foamable and vulcanizable latex compound an aqueous reinforced rubber dispersion comprising:
       i) 58-80 wt-% of base latex polymer particles wherein the base latex polymer is a synthetic styrene/butadiene rubber latex consisting of structural units of styrene and butadiene; and
       ii) 20-42 wt-% of reinforcing latex polymer particles comprising:
           1) 45 to 68.5 wt-% structural units of aromatic vinyl monomers; and
           2) 31.5 to 55 wt-% structural units of conjugated diene monomers, wherein the reinforcing latex polymer particles have a single glass transition temperature ($T_g$) from −25° C. to 28° C. as measured by differential scanning calorimetry (DSC),
       wherein the weight percentages of the polymer particles are based on the total weight of polymer particles in the rubber dispersion, and
       wherein the base latex polymer particles have a $T_g$ as measured by DSC that is lower than the $T_g$ of the reinforcing latex particles;
   b) foaming the vulcanizable latex compound;
   c) filling the foam obtained in step b) into a mold of desired shape;
   d) stabilizing the foam structure;
   e) vulcanizing the foam; and
   f) removing the vulcanized latex foam from the mold.

2. The method of claim 1, further comprising adding a gelling agent to make the foamable and vulcanizable latex compound, wherein the foaming is solely achieved by mechanical means and the foam structure is stabilized by at least partially gelling the latex foam prior to vulcanization.

3. The method of claim 1, wherein the vulcanizable latex compound is first foamed by mechanical means, the foamed compound is filled into a vacuum mold, the foamed compound is expanded to the volume of the mold by application of vacuum, and the foam structure is stabilized by rapid cooling of the foam followed by pressurizing the mold with carbon dioxide, thereby causing at least partial gelling of the foam prior to vulcanization.

4. The method of claim 1, wherein the reinforcing latex polymer particles consist of structural units of aromatic vinyl monomers, conjugated diene monomers and any residual initiator or emulsifier used in production of said reinforcing latex particles.

5. The method of claim 1, wherein the aromatic vinyl monomers are selected from the group consisting of styrene, α-methyl styrene, 4-methyl-styrene, α-chloro styrene, 4-chloro styrene, divinylbenzene, 4-methoxy-3-methylstyrene, 3,4-dimethyl-α-methylstyrene and combinations thereof.

6. The method of claim 1, wherein the conjugated diene monomers are selected from the group consisting of 1,3-butadiene, 2-chloro-1,3-butadiene, isoprene, conjugated straight-chain and branched pentadienes and hexadienes, and combinations thereof.

7. The method of claim 1, wherein the reinforcing latex polymer particles have a single glass transition temperature ($T_g$) from −20° C. to 25° C.

8. The method of claim 1, wherein the difference between the $T_g$ of the base latex polymer particles and the reinforcing latex polymer particles is at least 25° C. and at most 79° C.

9. The method of claim 1, wherein the reinforcing latex polymer particles comprise
   i) 45 to 67 wt-% structural units of aromatic vinyl monomers; and
   ii) 33 to 55 wt-% structural units of conjugated diene monomers.

10. The method of claim 1, wherein the aromatic vinyl monomers are selected from the group consisting of styrene, α-methyl styrene, 4-methyl-styrene, α-chlor styrene, 4-chloro styrene, divinylbenzene, 4-methoxy-3-methylstyrene, 3,4-dimethyl-α-methylstyrene and combinations thereof.

11. The method of claim 10, wherein the aromatic vinyl monomer is styrene.

12. The method of claim 1, wherein the conjugated diene monomers are selected from the group consisting of 1,3-butadiene, 2-chlor-1,3-butadiene, isoprene, conjugated straight-chain and branched pentadienes and hexadienes and combinations thereof.

13. The method of claim 12, wherein the conjugated diene monomers are 1,3-butadiene.

14. The method of claim 1, wherein the weight average particle size of the reinforcing polymer latex particles is 50 to 250 nm.

15. The method of claim 1, wherein the base latex polymer is a styrene/butadiene rubber latex comprising
   1) 15 to 32 wt-% structural units of styrene and
   2) 68 to 85 wt-% structural units of 1,3-butadiene,
   wherein the weight percentages are based on the total weight of styrene and 1,3-butadiene structural units.

16. The method of claim 1, wherein the rubber dispersion has a solids content of at least 55% by weight based on the total weight of the rubber dispersion.

17. The method according to claim 1, wherein the reinforcing latex polymer particles comprise synthetic styrene/butadiene rubber latex consisting of structural units of styrene and butadiene.

18. An article comprising a latex foam obtained from an aqueous reinforced rubber dispersion comprising:

i) 58-80 wt-% of base latex polymer particles wherein the base latex polymer is a synthetic styrene/butadiene rubber latex consisting of structural units of styrene and butadiene; and
   ii) 20-42 wt-% of reinforcing latex polymer particles comprising:
      1) 45 to 68.5 wt-% structural units of aromatic vinyl monomers; and
      2) 31.5 to 55 wt-% structural units of conjugated diene monomers, wherein the reinforcing latex polymer particles have a single glass transition temperature ($T_g$) from −25° C. to 28° C. as measured by differential scanning calorimetry (DSC),
   wherein the weight percentages of the polymer particles are based on the total weight of polymer particles in the rubber dispersion, and
   wherein the base latex polymer particles have a $T_g$ as measured by DSC that is lower than the $T_g$ of the reinforcing latex particles.

19. The article according to claim 18, wherein the latex foam has a hardness of less than 150 N as measured at a dry foam density of 75 g/dm$^3$ and 23° C. according to DIN EN ISO 2439 and a hysteresis of at least 50% as measured at a dry foam density of 75 g/dm$^3$ and 23° C. according to DIN 53577.

20. The article of claim 18, being selected from the group consisting of mattresses; pillows; neck rests; toppers; shock absorbers; shaped parts of shoes; shoe inside soles; garments padding; protectors for sportswear; athletic implements; bike saddles; motorbike saddles; furniture upholstery material; and bumpers.

21. The article of claim 18, wherein the reinforcing latex polymer particles have a single glass transition temperature ($T_g$) from −20° C. to 25° C.

22. The article of claim 18, wherein the difference between the $T_g$ of the base latex polymer particles and the reinforcing latex polymer particles is at least 25° C. and at most 79° C.

23. The article of claim 18, wherein the reinforcing latex polymer particles comprise
   i) 45 to 67 wt-% structural units of aromatic vinyl monomers; and
   ii) 33 to 55 wt-% structural units of conjugated diene monomers.

24. The article of claim 18, wherein the aromatic vinyl monomers are selected from the group consisting of styrene, α-methyl styrene, 4-methyl-styrene, α-chlor styrene, 4-chloro styrene, divinylbenzene, 4-methoxy-3-methylstyrene, 3,4-dimethyl-α-methylstyrene and combinations thereof.

25. The article of claim 24, wherein the aromatic vinyl monomer is styrene.

26. The article of claim 18, wherein the conjugated diene monomers are selected from the group consisting of 1,3-butadiene, 2-chlor-1,3-butadiene, isoprene, conjugated straight-chain and branched pentadienes and hexadienes and combinations thereof.

27. The article of claim 26, wherein the conjugated diene monomers are 1,3-butadiene.

28. The article of claim 18, wherein the weight average particle size of the reinforcing polymer latex particles is 50 to 250 nm.

29. The article of claim 18, wherein the base latex polymer is a styrene/butadiene rubber latex comprising
   1) 15 to 32 wt-% structural units of styrene and
   2) 68 to 85 wt-% structural units of 1,3-butadiene,
   wherein the weight percentages are based on the total weight of styrene and 1,3-butadiene structural units.

30. The article of claim 18, wherein the rubber dispersion has a solids content of at least 55% by weight based on the total weight of the rubber dispersion.

31. The article of claim 18, wherein the reinforcing latex polymer particles consist of structural units of aromatic vinyl monomers, conjugated diene monomers and any residual initiator or emulsifier used in production of said reinforcing latex particles.

32. The article of claim 18, wherein the aromatic vinyl monomers are selected from the group consisting of styrene, α-methyl styrene, 4-methyl-styrene, α-chloro styrene, 4-chloro styrene, divinylbenzene, 4-methoxy-3-methylstyrene, 3,4-dimethyl-α-methylstyrene and combinations thereof.

33. The article of claim 18, wherein the conjugated diene monomers are selected from the group consisting of 1,3-butadiene, 2-chloro-1,3-butadiene, isoprene, conjugated straight-chain and branched pentadienes and hexadienes, and combinations thereof.

34. The article according to claim 18, wherein the reinforcing latex polymer particles comprise synthetic styrene/butadiene rubber latex consisting of structural units of styrene and butadiene.

35. A method of making a mattress or a pillow comprising foaming into said mattress or said pillow an aqueous reinforced rubber dispersion comprising:
  i) 58-80 wt-% of base latex polymer particles wherein the base latex polymer is a synthetic styrene/butadiene rubber latex consisting of structural units of styrene and butadiene; and
  ii) 20-42 wt-% of reinforcing latex polymer particles comprising:
    1) 45 to 68.5 wt-% structural units of aromatic vinyl monomers; and
    2) 31.5 to 55 wt-% structural units of conjugated diene monomers, wherein the reinforcing latex polymer particles have a single glass transition temperature ($T_g$) from −25° C. to 28° C. as measured by differential scanning calorimetry (DSC),
wherein the weight percentages of the polymer particles are based on the total weight of polymer particles in the rubber dispersion, and
wherein the base latex polymer particles have a $T_g$ as measured by DSC that is lower than the $T_g$ of the reinforcing latex particles.

* * * * *

UNITED STATES PATENT AND TRADEMARK OFFICE
CERTIFICATE OF CORRECTION

PATENT NO. : 8,158,691 B2
APPLICATION NO. : 11/396246
DATED : April 17, 2012
INVENTOR(S) : Motz et al.

It is certified that error appears in the above-identified patent and that said Letters Patent is hereby corrected as shown below:

At column 1, line 67, please change "20-70°." to --20-70° C.--.
At column 3, line 52, please change "Tg" to --$T_g$--.
At column 3, line 54, please change "Tg" to --$T_g$--.
At column 3, line 55, please change "Tg" to --$T_g$--.
At column 3, line 57, please change "$\Delta T_G$" to --$\Delta T_g$--.
At column 4, line 62, please change "sulfoxilate," to --sulfoxylate,--.
At column 5, line 4, please change "mercaptanes" to --mercaptans--.

At column 8, lines 20-24, please change " $A_{75} = \dfrac{148.239}{0.0099\sigma^2 + 2.1575\sigma - 69.261} \cdot A_1$ " to -- $A_{75} = \dfrac{148.239}{0.0099\sigma^2 + 2.1575\sigma - 69.261} \cdot A_x$ --.

At column 8, line 46, please change "75 C" to --75° C--.
At column 9, line 53, please change "2,692" to --2.692--.
At column 10, line 45, please change "At" to --at--.
At column 11, line 29, please change "contents" to --content--.

Signed and Sealed this
Second Day of October, 2012

David J. Kappos
*Director of the United States Patent and Trademark Office*